(12) United States Patent
Serbetli (10) Patent No.: US 8,687,749 B2
(45) Date of Patent: Apr. 1, 2014

(54) MOBILE OFDM RECEIVER

(75) Inventor: Semih Serbetli, Eindhoven (NL)

(73) Assignee: NXP, B.V., Eindhoven (NL)

( * ) Notice: Subject to any disclaimer, the term of this patent is extended or adjusted under 35 U.S.C. 154(b) by 158 days.

(21) Appl. No.: 13/114,395

(22) Filed: May 24, 2011

(65) Prior Publication Data

US 2011/0293052 A1 Dec. 1, 2011

(30) Foreign Application Priority Data

May 25, 2010 (EP) .................................. 10163834

(51) Int. Cl.
*H04L 1/00* (2006.01)

(52) U.S. Cl.
USPC .......... 375/346; 375/148; 455/501; 455/63.1; 455/296

(58) Field of Classification Search
USPC ......... 375/144, 148, 260, 285, 346, 347, 349; 370/252, 203, 319, 321, 442, 464, 465, 370/480; 455/501, 504, 506, 63.1, 67.11, 455/67.13, 67.16, 226.1, 296
See application file for complete search history.

(56) References Cited

U.S. PATENT DOCUMENTS

| | | | |
|---|---|---|---|
| 8,218,613 B2 * | 7/2012 | Wu ............... | 375/232 |
| 8,428,158 B2 | 4/2013 | Maltsev et al. | |
| 2002/0181549 A1 * | 12/2002 | Linnartz et al. ............... | 375/142 |
| 2003/0031278 A1 | 2/2003 | Kang et al. | |
| 2009/0052566 A1 * | 2/2009 | Maltsev et al. ............... | 375/260 |
| 2009/0103666 A1 * | 4/2009 | Zhao et al. .................... | 375/341 |
| 2009/0225913 A1 * | 9/2009 | Nakahara et al. ............. | 375/347 |

FOREIGN PATENT DOCUMENTS

| | | |
|---|---|---|
| CN | 1462533 A | 12/2003 |
| CN | 101375567 A | 2/2009 |
| EP | 1 940 062 A1 | 7/2008 |
| EP | 1 968 268 A2 | 9/2008 |
| WO | 02/093859 A1 | 11/2002 |
| WO | 2007/105980 A1 | 9/2007 |
| WO | 2007/112489 A1 | 10/2007 |
| WO | 2010/106527 A1 | 9/2010 |

OTHER PUBLICATIONS

Russell, M. et al. "Interchannel Interference Analysis of OFDM in a Mobile Environment", IEEE 14$^{th}$ Vehicular Techn. Conf., vol. 2, pp. 820-824 (Jul. 1995).

Li, Y. et al. "Bounds on the Interchannel Interferences of OFDM in Time-Varying Impairments", IEEE Trans. on Communications, vol. 49, No. 3, pp. 401-404 (Mar. 2001).

Gorokhov, A. et al. "Robust OFDM Receivers for Dispersive Time-Varying Channels: Equalization and Channel Acquisition" IEEE Trans. on Comms., vol. 52, No. 4, pp. 572-583 (Apr. 2004).

(Continued)

*Primary Examiner* — Dac Ha (57) ABSTRACT

A receiver is provided, in particular a mobile Orthogonal Frequency Division (OFDM) receiver, wherein the receiver comprises a receiving unit for receiving a multicarrier signal via a transmitting channel, a channel estimation unit for estimating a channel estimation signal indicative of properties of the transmitting channel based on the multicarrier signal and a feedback provided at a position of a signal processing path of the receiver downstream of the channel estimation unit, and a compensation unit adapted for at least partially compensating signal distortions within the transmitting channel on basis of the multicarrier signal received by the receiving unit and the channel estimation signal estimated by the channel estimation unit, and for outputting the received multicarrier signal with at least partially compensated signal distortions.

13 Claims, 6 Drawing Sheets

(56) References Cited

OTHER PUBLICATIONS

Husen, S. A. et al. "Simple Doppler Compensation for DVB-T", $25^{th}$ Symp. on Info. Theory, 8 pgs (Jun. 2004).

Seyedi, A. et al. "General ICI Self-Cancellation Scheme for OFDM Systems", IEEE Trans. on Vehicular Technology, vol. 54, No. 1, pp. 198-210 (Jan. 2005).

Seo, B. et al. "Maximum Ratio Combining for OFDM Systems with Cochannel Interference", IEEE Trans. on Consumer Electronics, vol. 52, pp. 87-91 (Feb. 2006).

Extended European Search Report for European Patent Application No. 10163834.4 (Nov. 17, 2010).

\* cited by examiner

MOBILE OFDM RECEIVER

This application claims the priority under 35 U.S.C. §119 of European patent application no. 10163834.4, filed on May 25, 2010, the contents of which are incorporated by reference herein.

FIELD OF THE INVENTION

The invention relates to a receiver, in particular to a mobile Orthogonal Frequency Division Multiplex (OFDM) receiver.

Beyond this, the invention relates to a method of at least partially compensating signal distortions within a multicarrier signal.

Moreover, the invention relates to a program element.

Furthermore, the invention relates to a computer-readable medium.

BACKGROUND OF THE INVENTION

Orthogonal Frequency Division Multiplexing (OFDM) is an effective way to mitigate the multipath spread of the wireless channels by a simple equalization. Due to its robustness against the multipath spread of the channel and its high spectral efficiency, it has been widely adopted in different wireless standards, for example DVB-T/H, and it is also being considered as the most valuable candidate for future cellular radio systems. Though its advantages, the reception quality of OFDM systems is hampered by the intercarrier interference (ICI) due to the Doppler spread of the signal in high mobility scenarios. Mobility induced Doppler spreading distorts the orthogonality among the subcarriers, and results in intercarrier interferences. ICI degrades the reception quality by worsening the demodulation and decreasing the accuracy of the channel estimates. The ICI problem in mobile OFDM systems is a well known and widely studied problem.

The conventional solutions can be grouped under three categories, that means signal processing based ICI cancellation schemes, self ICI cancelling coding schemes, and multiple antenna techniques. Signal processing based ICI cancellation schemes require estimation of the time varying characteristics of the channel to estimate the interference of each subcarrier to its adjacent subcarriers to cancel the ICI, whereas self ICI cancelling coding schemes provide robustness to the mobility at the expense of reduced spectral efficiency. The multiple antenna approaches are based on exploiting antenna diversity and spatial processing to mitigate the ICI. Signal processing based ICI cancellation schemes are quite popular since they do not have any penalty in spectral efficiency or hardware cost with respect to self ICI cancelling coding schemes and multiple antenna solutions, respectively.

Although some Doppler compensation techniques are quite effective in single antenna mobile OFDM receivers, these schemes use the channel information obtained through the channel estimation stage which is also affected adversely by the ICI, thus, their performance is limited by the accuracy of these estimates. As the mobility induced Doppler spreading increases, the ICI power increases affecting also the pilot symbols that will be used for channel estimation stage.

OBJECT AND SUMMARY OF THE INVENTION

It is an object of the invention to provide a receiver, in particular a mobile Orthogonal Frequency Division Multiplex (OFDM) receiver, for receiving a multicarrier signal and for at least partially compensating signal distortions within the multicarrier signal in an improved way.

In order to achieve the object defined above, a receiver, a method of at least partially compensating signal distortions within a multicarrier signal, a program element and a computer-readable medium according to the independent claims are provided.

According to an exemplary embodiment of the invention, a receiver is provided, in particular a mobile Orthogonal Frequency Division Multiplex (OFDM) receiver. The receiver comprises a receiving unit for receiving a multicarrier signal via a transmitting channel. The receiver comprises further a channel estimation unit for estimating a channel estimation signal indicative of properties of the transmitting channel based on the multicarrier signal and a feedback signal provided at a position of a signal processing path of the receiver downstream of the channel estimation unit. Further, the receiver comprises a compensation unit adapted for at least partially compensating signal distortions within the transmitting channel on basis of the multicarrier signal received by the receiving unit and the channel estimation signal estimated by the channel estimation unit, and for outputting the received multicarrier signal with at least partially compensated signal distortions.

According to another exemplary embodiment of the invention, a method of at least partially compensating signal distortions within a multicarrier signal, in particular an OFDM signal, is provided. The method comprises receiving the multicarrier signal via a transmitting channel, estimating a channel estimation signal indicative of properties of the transmitting channel based on the multicarrier signal and a feedback signal, at least partially compensating signal distortions within the transmitting channel on basis of the multicarrier signal and the channel estimation signal, and outputting the received multicarrier signal with compensated signal distortions.

According to still another exemplary embodiment of the invention, a program element (for instance a software routine, in source code or in executable code) is provided, which, when being executed by a processor, is adapted to control or carry out a compensating method having the above mentioned features.

According to yet another exemplary embodiment of the invention, a computer-readable medium (for instance a CD, a DVD, a USB stick, a floppy disk or a harddisk) is provided, in which a computer program is stored which, when being executed by a processor, is adapted to control or carry out a compensating method having the above mentioned features.

Compensating signal distortions which may be performed according to embodiments of the invention can be realized by a computer program, that is by software, or by using one or more special electronic optimization circuits, that is in hardware, or in hybrid form, that is by means of software components and hardware components.

In Orthogonal Frequency Division Multiplexing (OFDM) systems, mobility induced Doppler spreading distorts the orthogonality among the subcarriers, and results in intercarrier interference (ICI). ICI degrades the reception quality by worsening the demodulation and decreasing the accuracy of the channel estimates. Different Doppler compensation techniques, for example ICI subtraction and LLR (log-likelihood-ratio) trick schemes, may be quite effective in single antenna mobile OFDM receivers. However, these schemes use the channel information obtained through the channel estimation stage which is also affected adversely by the ICI, thus, their performance is limited by the accuracy of these estimates.

According to this exemplary embodiment of the invention, Doppler compensation techniques are combined with a channel estimation based on a feedback signal, especially with decision-directed channel estimation schemes, so that the channel estimation accuracy, thus, the effectiveness of these Doppler compensation schemes can be improved. The used combination of two techniques may provide better Doppler tolerances, thus, better reception quality in high vehicle speeds of digital broadcast signals such as DVB-T, DVB-H, etc.

In the following, further exemplary embodiments of the receiver will be explained. However, these embodiments also apply to the method, to the program element and to the computer-readable medium.

The compensation unit may be a Doppler compensation unit adapted for at least partially compensating signal distortions due to mobility of the receiver.

The multicarrier signal may be an Orthogonal Frequency Division Multiplex (OFDM) signal. In OFDM, a large number of closely-spaced orthogonal sub-carriers are used to carry data. The data is divided into several parallel data streams or channels, one for each sub-carrier. Each sub-carrier is modulated with a conventional modulation scheme at a low symbol rate, maintaining total data rates similar to conventional single-carrier modulation schemes in the same bandwidth.

The feedback signal may comprise information as a basis for deciding on pilot symbols within the multicarrier signal.

Using a decision directed channel estimation may increase the accuracy of the channel estimates even at high mobility. More accurate channel information may be used in the compensation unit, that means in ICI cancellation stage, thus, the effectiveness to mitigate Doppler effects may be increased. The combination of compensation techniques and decision directed channel estimation may make the receiver more robust against mobility effects and may provide better reception quality than conventional approaches.

A conventional approach to estimate the channel gains and channel derivatives is to use scattered pilots in the frequency domain. However, as the mobility increases, the ICI power the scattered pilots experience will be higher, leading to less accurate information about the channel gain and derivative information that will be used in ICI mitigation and soft bit generation steps. Thus, according to this embodiment, a decision directed channel estimation may be used together with ICI mitigation methods and units. An initial, rough channel estimation may be done based on scattered pilots. This initial channel information may be used to obtain some decisions on the transmitted symbols leading to estimated symbols, which may be used as "new pilot symbols" to estimate the channel more accurately. The decisions on the transmitted symbols may be taken at different points in the chain.

The compensation unit may comprise an intercarrier interference subtraction unit for subtracting intercarrier interferences from the received multicarrier signal and/or a further unit for computing a reliability of the multicarrier signal.

To mitigate the ICI problem, two different approaches, namely ICI subtraction scheme and the log-likelihood-ratio (LLR) trick may be used. The ICI subtraction scheme provided by the intercarrier interference subtraction unit may simply first estimate the ICI at each subcarrier from neighboring subcarriers, and then may subtract it from the received signal to mitigate ICI. A so-called 3-tap ICI cleaned signal may result for example. Note that one may opt to use larger number of taps for ICI cancellation to further increase robustness against Doppler spreading.

The LLR trick, provided by the further unit, which may be a log-likelihood-ratio unit, previously developed for single antenna OFDM receivers, may be used to exploit the information regarding to ICI power level at each subcarrier. Instead of using uniform additive Gaussian noise power, remaining ICI and noise power may be used to compute the reliability, i.e., log-likelihood ratio (LLR), of the bits. Thus, also a used forward error correction (FEC) decoder, for example Viterbi decoder in DVB-T standard, may utilize more precise information regarding to the reliability of the input bits considering also the ICI power each bit experienced. The ICI and noise power each subcarrier experiences may depend on the number of taps used in the ICI subtraction phase.

The receiver may comprise a demodulation unit adapted for demodulating an output signal of the channel estimation unit and the OFDM signal and for generating and sending the feedback signal to the channel estimation unit.

The decisions on the transmitted symbols may be done simply at the demodulation stage without any ICI mitigation scheme applied. The equalized symbol may be demodulated directly using the OFDM signal. It may be the simplest form of decision directed channel estimation. The detected symbols may then be used as new pilots to re-estimate the channels.

The receiver may comprise a demodulation unit adapted for demodulating an output signal of the intercarrier interference subtraction unit and an output signal of the channel estimation unit and for generating and sending the feedback signal to the channel estimation unit.

The decisions on the transmitted symbols may be done after the ICI subtraction stage. First ICI subtraction may be applied to the received signal, for example for 3-tap ICI subtraction, then, the ICI mitigated signal may be equalized. The equalized symbols may be demodulated and then send back to the channel estimation unit. The detected symbols may then be used as new pilots to re-estimate the channels.

The receiver may comprise a forward error correction unit adapted for receiving an output signal of the compensation unit and adapted for correcting the output signal based on an error correction code.

Forward error correction (FEC) is a system of error correction for data transmission, whereby the sender may add (carefully selected) redundant data to its messages, also known as an error-correction code. This may allow the receiver to detect and correct errors (within some bound) without the need to ask the sender for additional data. The advantages of forward error correction are that a back-channel is not required and retransmission of data can often be avoided (at the cost of higher bandwidth requirements, on average).

FEC processing may often occur in the early stages of digital processing after a signal is first received. That is, FEC circuits are often an integral part of the analog-to-digital conversion process, also involving digital modulation and demodulation, or line coding and decoding. Many FEC coders can also generate a bit-error rate (BER) signal which can be used as feedback to fine-tune the analog receiving electronics. Soft-decision algorithms, such as the Viterbi decoder, can take (quasi-)analog data in, and generate digital data on output.

The receiver may comprise a feedback unit adapted for receiving an output of the forward error correction unit, for generating the feedback signal based on the output of the forward error correction unit and for sending the feedback signal to the channel estimation unit.

The decisions on the transmitted symbols may be done after an outer decoding stage of forward-error-correction.

The signal after the compensation unit may be send to an FEC decoder. The output signal of the FEC decoder may be send to the feedback unit, which may comprise a FEC encoder, an interleaver and a modulation unit. The decoded bits may be re-encoded, interleaved and remodulated to form the symbols to be used as new pilots. This approach may provide more reliable "new pilot symbols" than the two previous approaches, thus, more accurate channel estimation may be available with this approach, however, it may be more complex than the two previous methods, using demodulation units.

The receiver may comprise a further receiving unit and/or a further channel estimation unit for receiving a multicarrier signal via multiple antennas.

For example in cellular and WLAN systems, the industry trend in the reception of broadcast signals is to use multiple receive antennas and exploit diversity to mitigate the effects of Doppler spreading. According to this embodiment, a receiver may be used with multiple receive antennas to improve the Doppler tolerance, that means to use a Hybrid Doppler compensation scheme.

The compensation unit may further comprise a Doppler compensation combining unit, in particular a Simple Doppler Compensation Combining unit.

With this embodiment, multiple receive antennas may be realized. Due to multiple antenna reception of the broadcast signals through two receive antennas, the mobile receiver may have two different observations of the transmitted signal propagated through different time-varying channels. Due to the difference in the channels, the channel gains and ICI levels experienced at each observed signal may be different. The signals from multiple antennas can be combined with different schemes such as antenna selection (AS), preset-weight combining (PWC), maximum-ratio-combining (MRC), minimum-mean-squared-error (MMSE) combining or simple Doppler compensating combining (SDCC). With a combining method, some of ICI can be mitigated by spatial combining of the signals, and, since after the combining step, the receiver has to deal with only single observation rather than two observations, the complexity of the receiver may be reduced.

In this embodiment, a SDCC unit may be used which is a simplified version of MMSE combining and an effective combining scheme with moderate complexity. SDCC combining may provide much higher Doppler tolerance than the conventional MRC in normal conditions. The SDCC scheme may also robust against different channel models, i.e., in both near-scatter and far-scatter environments. It may provide higher Doppler tolerances than the other spatial combining schemes in all channel realizations.

SDCC may require basically four steps:
1. Computation of the combining weights,
2. Normalization of the combining weights, for maintaining the noise power fixed over the subcarriers,
3. Combining the received signals with the computed combiner weights, and
4. Computing the channel gain and channel derivatives of the combined signal.

The compensation unit according to this embodiment may use a hybrid Doppler compensation scheme that may be robust to different channel models and scenarios. The hybrid Doppler compensation scheme may combine three different Doppler compensation mechanisms, i.e., Simple Doppler Compensation Combining (SDCC), 3 tap ICI cancellation, which may also be 5 tap, 7 tap etc., and log-likelihood ratio (LLR) trick. All of these methods may use the channel information to mitigate the ICI signal where scattered pilot signals are used to estimate the channel gains and channel derivatives. However, the channel information obtained through the channel estimation stage which is also affected adversely by the ICI, thus, their performance is limited by the accuracy of these estimates. Here, the hybrid Doppler compensation combining may be combined with decision directed channel estimation to improve the channel estimation accuracy and ICI mitigation techniques also for multiple receive antennas. The receiver, used in single antenna OFDM systems, may be extended to OFDM systems with multiple receive antennas leading to combining decision directed channel estimation with the Hybrid Doppler compensation method.

The receiver may comprise a demodulation unit adapted for demodulating an output signal of the channel estimation unit and an output signal of the Doppler compensation combining unit, and for generating and sending the feedback signal to the channel estimation unit.

The decision may be taken after the demodulation of the SDCC combined signals from the receive antennas. The detected symbols may then be used as new pilots to re-estimate the channels.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

DESCRIPTION OF EMBODIMENTS

The illustration in the drawing is schematically. In different drawings, similar or identical elements are provided with the same reference signs.

Orthogonal Frequency Division Multiplexing (OFDM) is an effective way to mitigate the multipath spread of the wireless channels by a simple equalization. Due to its robustness against the multipath spread of the channel and its high spectral efficiency, it has been widely adopted in different wireless standards, e.g., DVB-T/H, and it is also being considered as the most valuable candidate for future cellular radio systems. Though its advantages, the reception quality of OFDM systems is hampered by the intercarrier interference (ICI) due to the Doppler spread of the signal in high mobility scenarios. ICI degrades the reception quality by worsening the demodulation and decreasing the accuracy of the channel estimates. The ICI problem in mobile OFDM systems is a well known and widely studied problem. Known solutions can be grouped under three categories, i.e., signal processing based ICI cancellation schemes, self ICI cancelling coding schemes, and multiple antenna techniques. Signal processing based ICI cancellation schemes require estimation of the time varying characteristics of the channel to estimate the interference of each subcarrier to its adjacent subcarriers to cancel the ICI, whereas self ICI cancelling coding schemes provide robustness to the mobility at the expense of reduced spectral efficiency. The multiple antenna approaches are based on exploiting antenna diversity and spatial processing to mitigate the ICI. Signal processing based ICI cancellation schemes are quite popular since they do not have any penalty in spectral efficiency or hardware cost with respect to self ICI cancelling coding schemes and multiple antenna solutions, respectively. ICI subtraction and LLR trick schemes are Doppler compensation techniques shown to be quite effective in single antenna mobile OFDM receivers. However, these schemes use the channel information obtained through the channel estimation stage which is also affected adversely by the ICI, thus, their performance is limited by the accuracy of these estimates.

Figure 2:
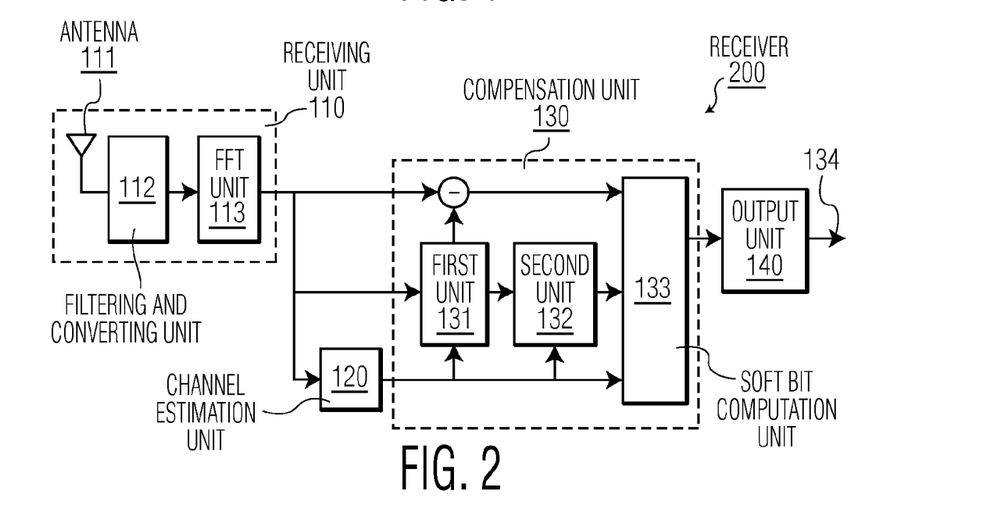
FIG. 2 illustrates a block diagram of a conventional mobile OFDM receiver.

FIG. 2 illustrates a conventional OFDM receiver 200. A conventional OFDM system is considered, where N complex symbols, $s=[s_1, s_2, \ldots, s_m, s_N]$, are modulated onto N orthogonal subcarriers by using an N-point IFFT. It is assumed that a cyclic prefix longer than the length of the channel impulse response is inserted to the signal to prevent inter-block-interference. The transmitted signal goes through a time varying multipath channel consisting of uncorrelated paths with complex attenuation $\{h_l(t)\}$ and delay of $\{\tau_l\}$ having an impulse response $$h(t,\tau) = \sum_{l=0}^{L-1} h_l(t)\delta(\tau-\tau_l) \quad (1)$$

where L is the number of multipath components. It is assumed that each multipath term $h_l(t)$ is composed of P independent and identically distributed scattered signals with uniformly distributed angle-of-arrivals (AOAs) $\theta_{l,p}$ as $$h_l(t) = \sum_{p=0}^{P-1} \bar{h}_{l,p} e^{j2\pi f_D \cos(\theta_{l,p})t + j\Delta_{l,p}} \quad (2)$$

where $f_D = f_c \cdot v/c$ with v as the speed of the mobile unit, $c=3 \cdot 10^8$ m/s, and $f_c$ is the carrier frequency. $\bar{h}_{l,p}$ is the path gain, $\theta_{l,p}$ is the AOA, and $\Delta_{l,p}$ is the phase of the pth scattered component of the lth multipath.

The baseband received signal in time domain is denoted as r(t), and expressed as $$r(t) = \sum_{m=0}^{N-1} H_m(t) e^{j2\pi m f_s t} s_m + v(t) \quad (3)$$

where $H_m(t) = \sum_l h_l(t) e^{j2\pi m f_s \tau_l}$ is the channel frequency response of subcarrier m at time t, $f_s$ is the subcarrier spacing, and v(t) is the additive white Gaussian noise (AWGN) with variance a $\sigma_{noise}^2$. The signal is received via a receiving unit 110 comprising an antenna 111 and a unit 112 comprising an RX filter and an analog/digital converter for filtering and converting the signal. $H_m(t)$ can be approximated by using Taylor series expansion around $t_0$ up to the first-order term as $$H_m(t) \approx H_m(t_0) + H'_m(t_0)(t-t_0) \quad (4)$$

where $t_0$ can be chosen as the middle of the windowed OFDM symbol. Using (4), after sampling the received signal, appropriate windowing and FFT operation (done in the unit 113), the baseband received signal at the $m^{th}$ subcarrier, $y_m$, can be approximated as $$y_m \approx H_m(t_0) s_m + \sum_{n=0}^{N-1} H'_n(t_0) \Xi_{m,n} s_n + \vartheta_m \quad (5)$$

wherein $$\Xi_{m,n} = \frac{1}{N^2 f_s} \sum_{k=0}^{N-1} (k-(N-1)/2) e^{j2\pi(n-m)k/N} \quad (6)$$

with $t_0$ chosen as the middle of the windowed OFDM symbol. The term in the summation of (5) represents the ICI term which $m^{th}$ subcarrier experiences.

It is assumed that the channel frequency response of subcarrier m, $H_m(t_0)$, is estimated in a channel estimation unit 120 by using the pilot subcarriers at each OFDM symbol for each antenna, for example by using the scattered pilots in DVB-T, and the channel derivative of each subcarrier, $H'_{i,m}(t_0)$, can be simply obtained using the channel frequency response of next and previous OFDM symbols as $$H'_{i,m}(t_0) = \frac{H_{i,m}(t_0+T_{OFDM}) - H_{i,m}(t_0-T_{OFDM})}{2T_{OFDM}} \quad (7)$$

where $H_{i,m}(t_0+T_{OFDM})$ and $H_{i,m}(t_0-T_{OFDM})$ represent the channel frequency response of subcarrier m of $i^{th}$ antenna for the next and previous OFDM symbols, respectively, and $T_{OFDM}$ is the OFDM symbol duration, i.e. $1/f_s+T_{CP}$ with $T_{CP}$ as the duration of cyclic prefix.

To mitigate the ICI problem, two units are used in the receiver of FIG. 2, namely a first unit 131 using an ICI subtraction scheme and a second unit 132 using a log-likelihood-ratio (LLR) trick. ICI subtraction scheme simply first estimates the ICI at each subcarrier from neighboring subcarriers, and then subtracts it from the received signal to mitigate ICI. In this context, the resulting 3-tap ICI cleaned signal is simply $$\tilde{y}_m = y_m - \frac{y_{m-1} \Xi_{m,m-1} H'_{m-1}}{H_{m-1}} - \frac{y_{m+1} \Xi_{m,m+1} H'_{m+1}}{H_{m+1}} \quad (8)$$

It should be noted that one may opt to use larger number of taps for ICI cancellation to further increase robustness against Doppler spreading.

The LLR trick previously developed for single antenna OFDM receivers is a simple method to exploit the information regarding to ICI power level at each subcarrier. Instead of using uniform additive Gaussian noise power, remaining ICI and noise power can be used to compute the reliability, i.e., log-likelihood ratio (LLR), of the bits. Thus, the FEC decoder, e.g., Viterbi decoder in DVB-T standard, can utilize more precise information regarding to the reliability of the input bits considering also the ICI power each bit experienced. The ICI and noise power each subcarrier experiences depends on the number of taps used in the ICI subtraction phase, i.e., 3 in this embodiment, and can be expressed as $$\sigma_{ICI+N,m}^2 = \sigma_{noise}^2 + \Sigma_{|n-m|\geq 1}|H'_n|^2|\Xi_{m,n}|^2 \approx \sigma_{noise}^2 + |H'_m|^2\Sigma_{|n-m|>1}|\Xi_{m,n}|^2 \quad (9)$$

Using the approximation, estimation of the remaining ICI and noise power is rather simplified.

It should be noted that both of the ICI mitigation steps use the channel and channel derivative information to compensate for Doppler effects. However, as the mobility induced Doppler spreading increases, the ICI power increases affecting also the pilots that will be used for channel estimation stage. Thus, ICI degrades the accuracy of this vital information which can be used at the receiver to mitigate Doppler effects.

Figure 1:
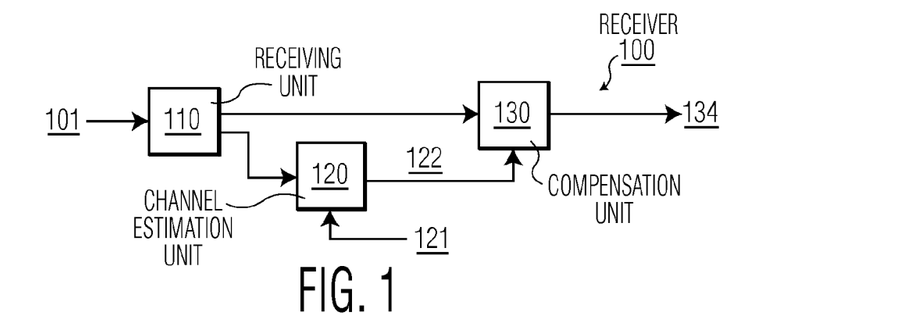
FIG. 1 illustrates a receiver according to an exemplary embodiment of the invention.

According to an embodiment of the invention as illustrated in FIG. 1, it is thus proposed to use a decision-directed channel estimation together with the ICI subtraction scheme and LLR trick to improve the channel estimation accuracy, thus, to increase the effectiveness of these approaches to mitigate the Doppler effects.

Therefore, the receiver 100 comprises a receiving unit 110 for receiving a multicarrier or OFDM signal 101 via a transmitting channel. A channel estimation unit 120 receives the OFDM signal from the receiving unit and receives further a feedback signal 121. Based on these two signals, properties of the transmitting channel are estimated based on a decision-directed channel estimation and a channel estimation signal is then sent to a compensation unit 130. The compensation unit provides then a signal 134 in which at least partially signal distortions, e.g. intercarrier interferences, are compensated.

Using decision directed channel estimation method can increase the accuracy of the channel estimates even at high mobility. More accurate channel information can be used in ICI cancellation stage, thus, it can increase the schemes' effectiveness to mitigate Doppler effects. The combined methods can make the receiver more robust against mobility effects and provide better reception quality than the conventional approaches.

Figure 3:
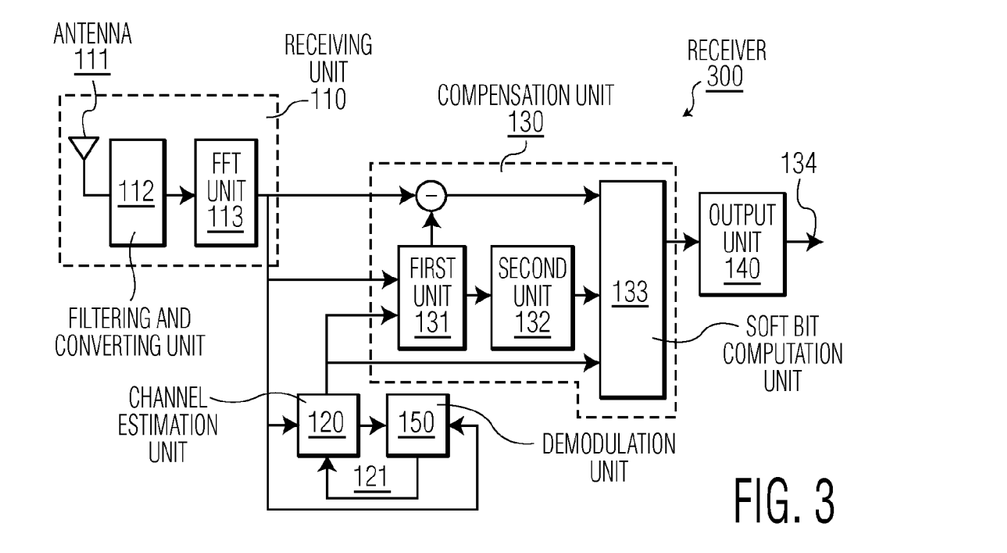
FIG. 3 illustrates a receiver according to a further exemplary embodiment of the invention.
Figure 4:
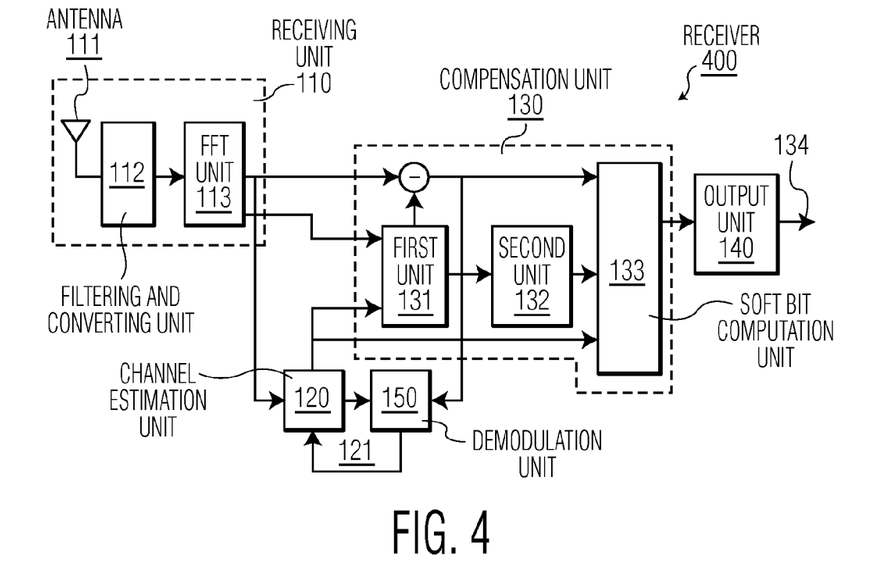
FIG. 4 illustrates a receiver according to a further exemplary embodiment of the invention.
Figure 5:
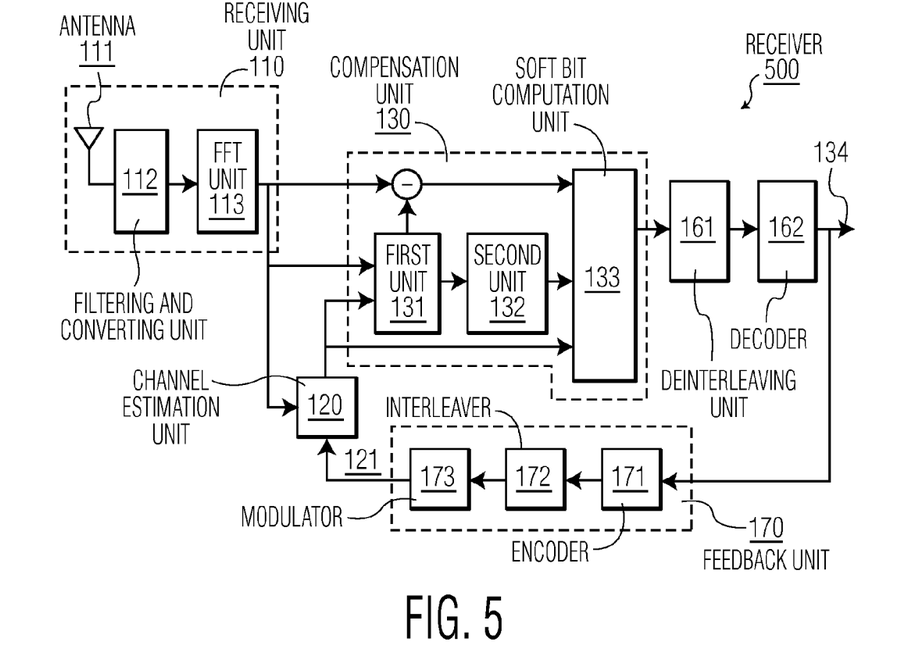
FIG. 5 illustrates a receiver according to a further exemplary embodiment of the invention.

The conventional approach to estimate the channel gains and channel derivatives is to use scattered pilots in the frequency domain as they are defined in the standard documents. However, as the mobility increases, the ICI power the scattered pilots experience will be higher, leading to less accurate information about the channel gain and derivative information that will be used in ICI mitigation and soft bit generation steps (done in the unit 133 being a soft bit computation unit). In embodiments according to the invention, a decision directed channel estimation may be used together with ICI mitigation methods. An initial, rough channel estimation can be done based on scattered pilots. This initial channel information can be used to obtain some decisions on the transmitted symbols, and estimated symbols can be used as "new pilot symbols" to estimate the channel more accurately. The decisions on the transmitted symbols can be taken at different points in the chain. In FIG. 3-5, example embodiments are presented, using three types of implementation of the proposed approach.

FIG. 3 shows a receiver 300, in which the decisions on the transmitted symbols may be done simply at the demodulation stage without any ICI mitigation scheme applied (so called "cheap small loop"). The equalized symbol $$\hat{s}_m = y_m/H_m \quad (10)$$

is demodulated to the closest point in the constellation diagram. That means that the conventional receiver of FIG. 2 comprises an additional demodulation unit 150 receiving the OFDM signal and an output signal of the channel estimation unit 120. It is the simplest form of decision directed channel estimation as proposed here. The detected symbols are then used as new pilots to re-estimate the channels. The receiver further comprises an output unit 140.

FIG. 4 shows a receiver 400, in which the decisions on the transmitted symbols may be done after the ICI subtraction stage (so called "ICI mitigated small loop"). First ICI subtraction is applied to the received signal as defined in (8) for 3-tap ICI subtraction, then, the ICI mitigated signal is equalized as $$\hat{s}_m = \tilde{y}_m/H_m \quad (11)$$

The equalized symbols are demodulated to the closest point in the constellation diagram. That means that the conventional receiver of FIG. 2 comprises an additional demodulation unit 150 receiving an output signal of the channel estimation unit 120 and the resulting signal after the ICI signal generation in unit 131. The detected symbols are then used as new pilots to re-estimate the channels.

FIG. 5 shows a receiver 500, in which the decisions on the transmitted symbols may be done after the outer decoding stage of forward-error-correction in the FEC decoder 162 after deinterleaving 161 (so called "big loop"). The decoded bits are further processed in the feedback unit 170, that means re-encoded (FEC encoder 171), interleaved (interleaver 172) and remodulated (modulator 173), to form the symbols to be used as new pilots. This approach may provide more reliable "new pilot symbols" than the two previous approaches, thus, more accurate channel estimation may be available with this approach, however, it is more complex than the two previous methods.

Figure 6:
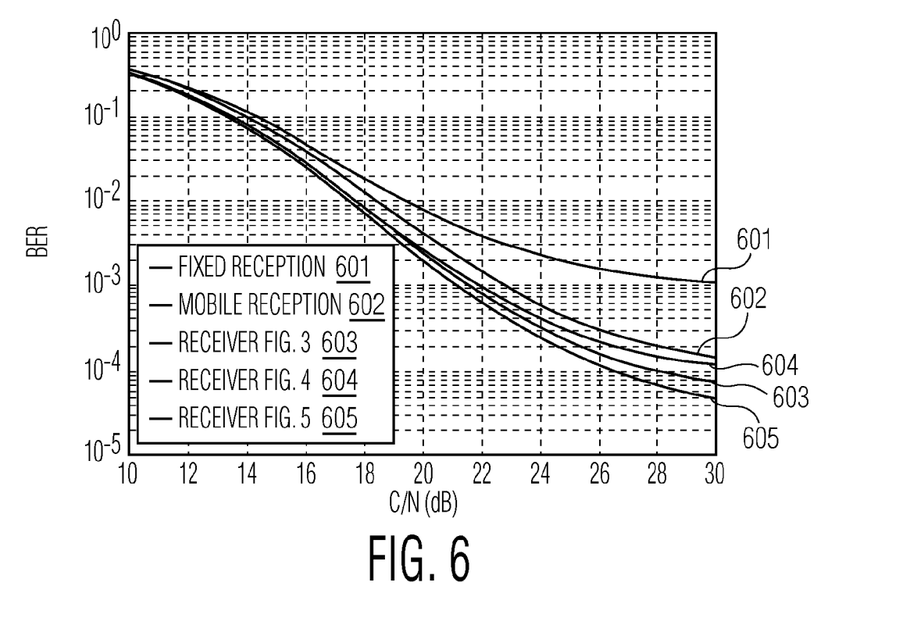
FIG. 6 illustrates a diagram of a performance comparison of different types of receivers with a Doppler frequency of 70 Hz.
Figure 7:
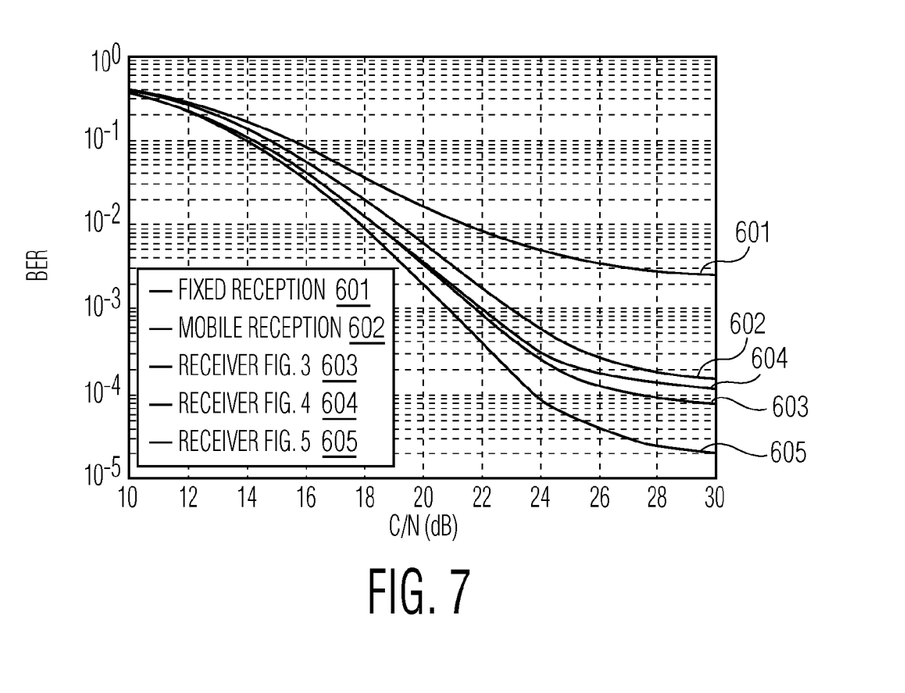
FIG. 7 illustrates a diagram of a performance comparison of different types of receivers with a Doppler frequency of 120 Hz.

In FIGS. 6 and 7, the benefits of the new approaches of combining decision directed channel estimation with ICI subtraction and LLR trick methods are shown by simulation of the BER performance of a mobile OFDM system at different Doppler frequencies and channel models. A 16-QAM modulated DVB-T signal in 8K OFDM mode with a guard interval of ¼, 1116 Hz of subcarrier spacing and a convolutional coding rate R=⅔ as specified in DVB-T standard is considered. It may be assumed that the initial channel estimation is simply done by interpolating the channel estimates of the scattered pilots in frequency domain only for each OFDM symbol. FIGS. 6 and 7 show the BER performance comparison of a fixed receiver ignoring the mobility effects (graph 601), a conventional mobile receiver with 3-tap ICI subtraction and LLR trick (graph 602), the receiver of FIG. 3 (graph 603), the receiver of FIG. 4 (graph 604) and the receiver of FIG. 5 (graph 605).

In FIG. 6, comparison is made for a rich scattering environment with a Doppler frequency of 70 Hz. It is observed that the proposed approach of combining decision directed channel estimation with ICI subtraction and LLR trick schemes provide a significant improvement on BER performance. As expected, the receiver of FIG. 5 is the best performing approach due to its more complex and reliable decisions.

In FIG. 7, BER performance comparison is made for a poor scattering environment with a Doppler frequency of 120 Hz. Similar performance enhancement is observed with the proposed approaches in this case as well.

In the following, the receiver of FIG. 3-5 is extended to a multiple receiving antenna system. For this system, a hybrid Doppler compensation scheme may be used that is robust to different channel models and scenarios. The proposed scheme may combine three different Doppler compensation mechanisms, i.e., Simple Doppler Compensation Combining (SDCC), 3 tap ICI cancellation and log-likelihood ratio (LLR) trick. All of these methods use the channel information to mitigate the ICI signal where scattered pilot signals are used to estimate the channel gains and channel derivatives. However, the channel information obtained through the channel estimation stage which is also affected adversely by the ICI, thus, their performance is limited by the accuracy of these estimates. As shown and explained above, decision directed channel estimation can be used to improve the channel estimation accuracy and ICI mitigation techniques in single antenna OFDM systems. Now, this approach may be extended to OFDM systems with multiple receive antennas leading to combining decision directed channel estimation with the Hybrid Doppler compensation method. The decisions may be taken in two ways: after the demodulation of the SDCC combined signals from the receive antennas and after the FEC decoder. This proposed approach may provide better Doppler tolerances than conventional Hybrid Doppler compensation methods, thus, better reception quality in high vehicle speeds for digital broadcast signals such as DVB-T, DVB-H, etc.

As single antenna receiver ICI mitigation schemes may be computationally intensive and may provide limited Doppler tolerance, in cellular and WLAN systems, the industry trend in the reception of broadcast signals is to use multiple receive antennas and exploit diversity to mitigate the effects of Doppler spreading. Here, a mobile equalizer for mobile OFDM receivers with multiple receive antennas is proposed to improve the Doppler tolerance, i.e., Hybrid Doppler compensation scheme. The approach may use channel information to mitigate ICI which is obtained by using scattered pilot signals.

Figure 8:
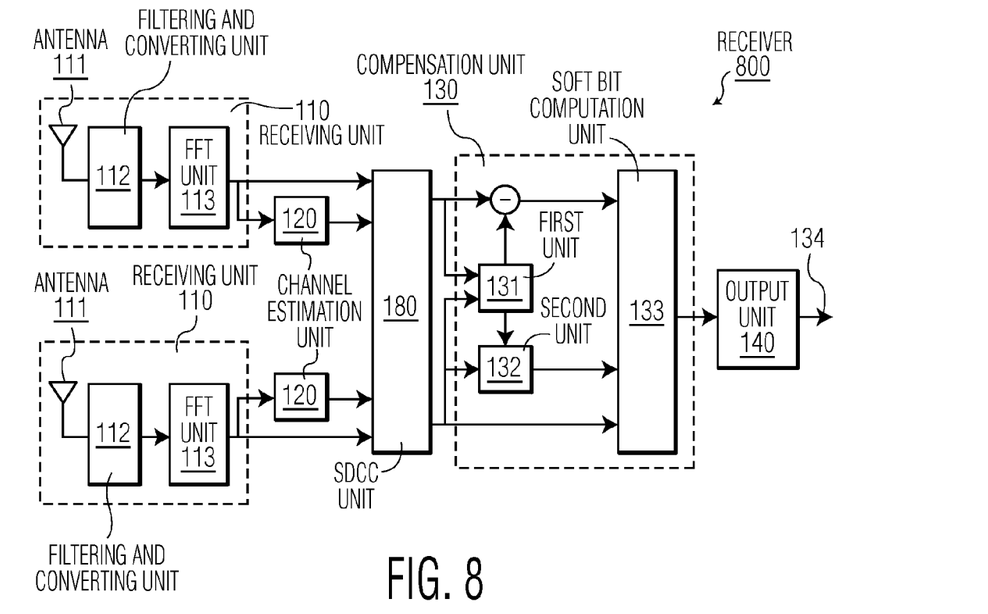
FIG. 8 illustrates a block diagram of a mobile OFDM receiver with multiple receive antennas.

FIG. 8 illustrates a conventional OFDM receiver 800 based on the conventional OFDM receiver as shown in FIG. 2 and the corresponding description and extended to comprise two receiving units 110 with, in this example, two receiving antennas 111.

In the following, a conventional OFDM system with M receive antennas is considered. The formulas as explained in context with FIG. 2 are extended to multiple receive antennas. The complex attenuation is now $\{h_{i,t}(t)\}$ and the impulse response is $$h_i(t,\tau) = \sum_{l=0}^{L-1} h_{i,l}(t)\delta(\tau-\tau_l) \tag{12}$$

for the $i^{th}$ receive antenna where L is the number of multipath components. It is assumed that each multipath term $h_{i,l}(t)$ is composed of P independent and identically distributed scattered signals with uniformly distributed angle-of-arrivals (AOAs) $\theta_{l,p}$ as $$h_{i,l}(t) = \sum_{p=0}^{P-1} \overline{h}_{l,p} e^{j2\pi f_D \cos(\theta_{l,p})t + j\Delta_{i,l,p}} \tag{13}$$

where $f_D = f_c \cdot v/c$ with v as the speed of the mobile unit, $c = 3 \cdot 10^8$ m/s, and $f_c$ is the carrier frequency. $\overline{h}_{l,p}$ is the path gain, $\theta_{l,p}$ is the AOA, and $\Delta_{i,l,p}$ is the phase of the pth scattered component of the lth multipath of ith antenna. It should be noted that $\{\Delta_{i,l,p}\}$ depends on AOA and the relative positions of the receive antennas.

The baseband received signal at the $i^{th}$ receive antenna in time domain is denoted as $r_i(t)$, and expressed as $$r_i(t) = \sum_{m=0}^{N-1} H_{i,m}(t) e^{j2\pi m f_s t} s_m + v_i(t) \tag{14}$$

where $H_{i,m}(t) = \sum_l h_{i,l}(t) e^{j2\pi m f_s \tau_l}$ is the channel frequency response of subcarrier m at time t at the $i^{th}$ antenna, $f_s$ is the subcarrier spacing, and $v_i(t)$ is the additive white Gaussian noise (AWGN) with variance $\sigma_{noise}^2$ at the $i^{th}$ antenna. $H_{i,m}(t)$ can be approximated by using Taylor series expansion around $t_0$ up to the first-order term as $$H_m(t) \approx H_m(t_0) + H'_m(t_0)(t-t_0) \tag{15}$$

where $t_0$ can be chosen as the middle of the windowed OFDM symbol. Using (15), after sampling the received signal, appropriate windowing and FFT operation, the baseband received signal at the $m^{th}$ subcarrier of $i^{th}$ antenna, $y_{i,m}$, can be approximated as $$y_{i,m} \approx H_{i,m}(t_0)s_m + \sum_{n=0}^{N-1} H'_{i,n}(t_0)\Xi_{m,n}s_n + \theta_m \tag{16}$$

with $t_0$ chosen as the middle of the windowed OFDM symbol. The term in the summation of (16) represents the ICI term which $m^{th}$ subcarrier experiences. It should be noted that $\Xi_{m,n} = 0$ and for small $|m-n|$ values $\Xi_{m,n}$ can be approximated by $$\Xi_{m,n} = \frac{1}{jN^2 f_s \sin\left(\frac{2\pi(n-m)}{N}\right)} \tag{17}$$

Stacking all the received signals of $m^{th}$ subcarrier from each receive antenna, the received signal can be represented in a vector form as $$y_m = \begin{bmatrix} y_{1,m} \\ y_{2,m} \\ \vdots \\ y_{M,m} \end{bmatrix} \approx \begin{bmatrix} H_{1,m} \\ H_{2,m} \\ \vdots \\ H_{M,m} \end{bmatrix} s_m + \sum_{n=0}^{N-1} \begin{bmatrix} H'_{1,n} \\ H'_{2,n} \\ \vdots \\ H'_{M,n} \end{bmatrix} \Xi_{m,n} s_n + \begin{bmatrix} \vartheta_{1,m} \\ \vartheta_{2,m} \\ \vdots \\ \vartheta_{M,m} \end{bmatrix} \approx \tag{18}$$

$$c_m s_m + \sum_{n=0}^{N-1} d_n \Xi_{m,n} s_n + \overline{\vartheta}_m$$

It should be noted that the first term in the right of the approximation is the intended signal at the $m^{th}$ subcarrier whereas the second term in the summation represents only the ICI from the neighboring subcarriers since $\Xi_{m,n} = 0$.

Hybrid Doppler compensation scheme as shown by FIG. 8 uses a Simple Doppler Compensating Combiner (SDCC) 180, ICI subtraction scheme 131 and LLR trick 132.

The SDCC can be expressed as $$g_m^{SDCC} = c_m - \frac{\alpha(d_m^\dagger c_m)}{\sigma_n^2 + \alpha|d_m|^2} d_m \tag{19}$$

where $\alpha = \sum_{n=0}^{N-1} |\Xi_{m,n}|^2$.

After the linear combining step, the receiver has single observation of the signal as $$y_{c,m} \approx H_{c,m} s_m + \sum_{n=0}^{N-1} H'_{c,n} \Xi_{m,n} s_n + \theta_{c,m} \tag{20}$$

where $y_{c,m} = g_m^\dagger y_m$, $H_{c,m} = g_m^\dagger c_m$, $H'_{c,n} = g_m^\dagger d_n$ and $\theta_{c,m} = g_m^\dagger \overline{\theta}_m$ with $g_m = g_m^{SDCC} / \sqrt{(g_m^{SDCC})^\dagger g_m^{SDCC}}$.

It is proposed to use a 3-tap ICI cancellation in the combined signal since the closest subcarriers create the highest ICI levels. In this context, the resulting ICI cleaned signal is simply $$\tilde{y}_{c,m} = y_{c,m} - \frac{y_{c,m-1}\Xi_{m,m-1}H'_{c,m-1}}{H_{c,m-1}} - \frac{y_{c,m+1}\Xi_{m,m+1}H'_{c,m+1}}{H_{c,m+1}} \quad (21)$$

The ICI and noise power each subcarrier experiences may depend also in this embodiment on the number of taps used in the ICI subtraction phase, i.e., 3 in the proposed example solution, and can be expressed as $$\sigma_{ICI+N,m}^2 = \sigma_{noise}^2 + \Sigma_{|n-m|>1}|H'_{c,n}|^2|\Xi_{m,n}|^2 \approx \sigma_{noise}^2 + |H'_{c,m}|^2\Sigma_{|n-m|>1}|\Xi_{m,n}|^2 \quad (22)$$

It should be realized that all of the SDCC, ICI subtraction and LLR trick steps, use the channel and channel derivative information to compensate for Doppler effects. However, as the mobility induced Doppler spreading increases, the ICI power increases affecting also the pilots that will be used for channel estimation stage. Thus, ICI may degrade the accuracy of this vital information which can be used at the receiver to mitigate Doppler effects.

Figure 9:
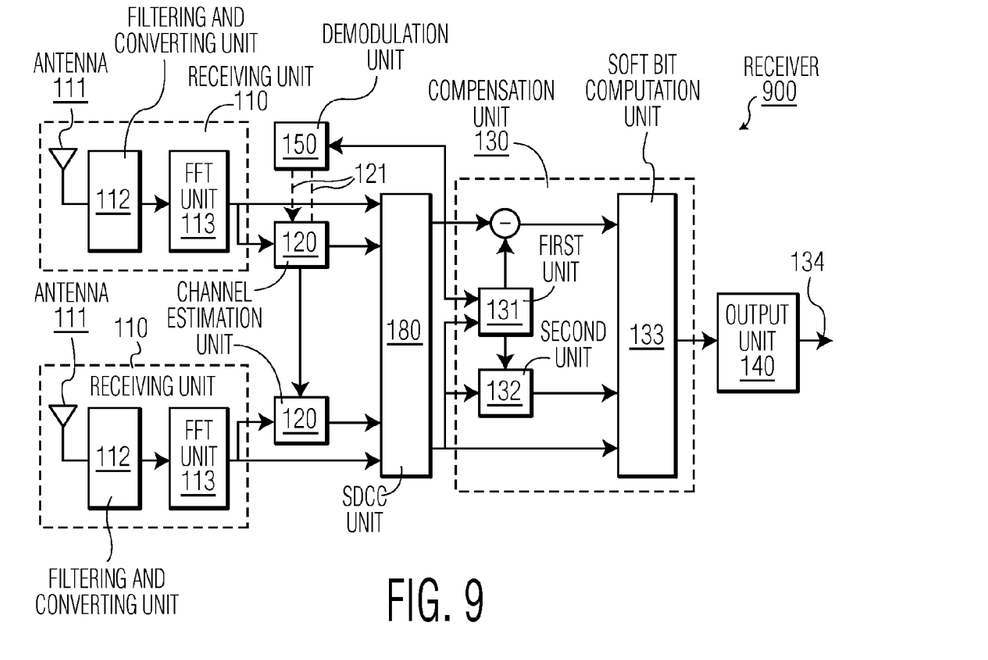
FIG. 9 illustrates a receiver with multiple receive antennas according to an exemplary embodiment of the invention.
Figure 10:
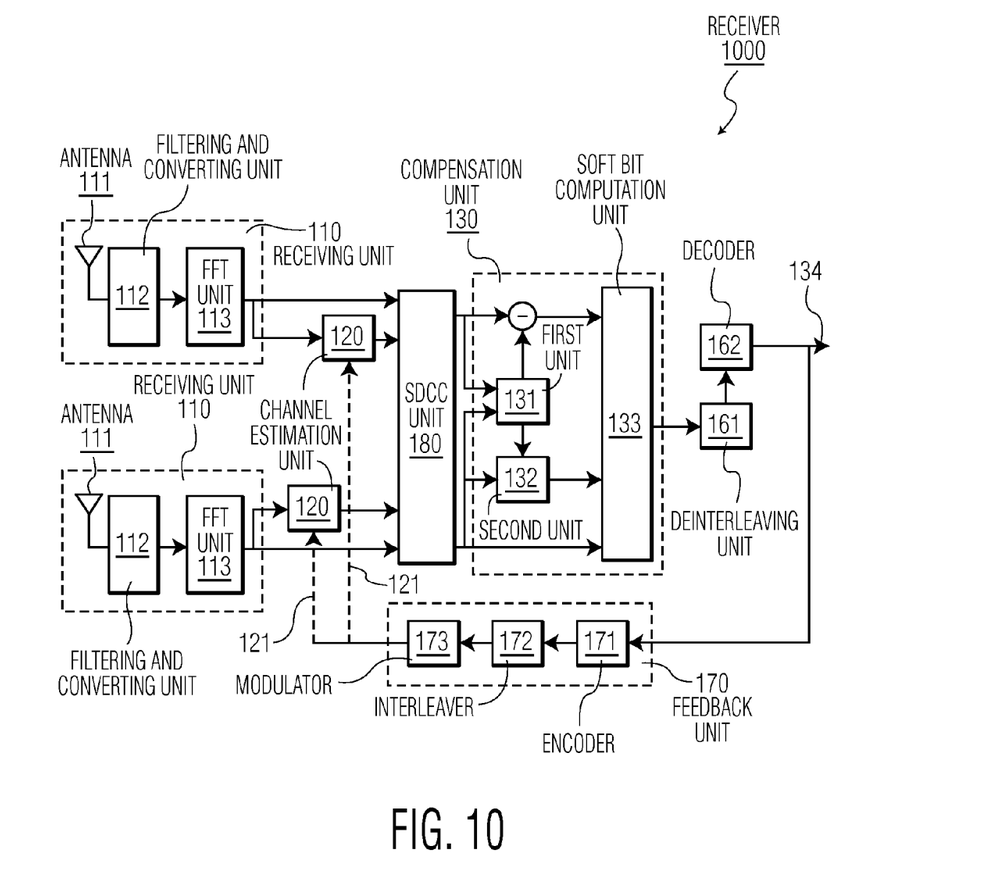
FIG. 10 illustrates a receiver with multiple receive antennas according to a further exemplary embodiment of the invention.

Therefore, a decision-directed channel estimation may be used together with Hybrid Doppler compensation solution to improve the channel estimation accuracy, thus, to increase the effectiveness of these approaches to mitigate the Doppler effects. FIGS. 9 and 10 show exemplary embodiments of a receiver according to the invention, comprising the components of the conventional receiver of FIG. 8.

In the receiver 900 of FIG. 9, the decisions on the transmitted symbols may be done simply at the demodulation stage after SDCC scheme applied (so called "small loop"). That means that the receiver comprises a demodulation unit 150 receiving an output signal of the SDCC unit 180. The equalized symbol $$\hat{s}_m = y_{c,m}/H_{c,m} \quad (23)$$

is demodulated to the closest point in the constellation diagram. It is a simple form of decision directed channel estimation. The detected symbols are then used as new pilots to re-estimate the channels.

The receiver 1000 of FIG. 10 comprises a FEC decoder and a feedback unit as already explained in context of FIG. 5. The decisions on the transmitted symbols are done after the outer decoding stage of forward-error-correction (so called "big loop"). The decoded bits are re-encoded, interleaved and remodulated to form the symbols to be used as new pilots. This approach may provide more reliable "new pilot symbols" than the previous approach, thus, more accurate channel estimation may be available with this approach, however, it is more complex than the previous method.

Figure 11:
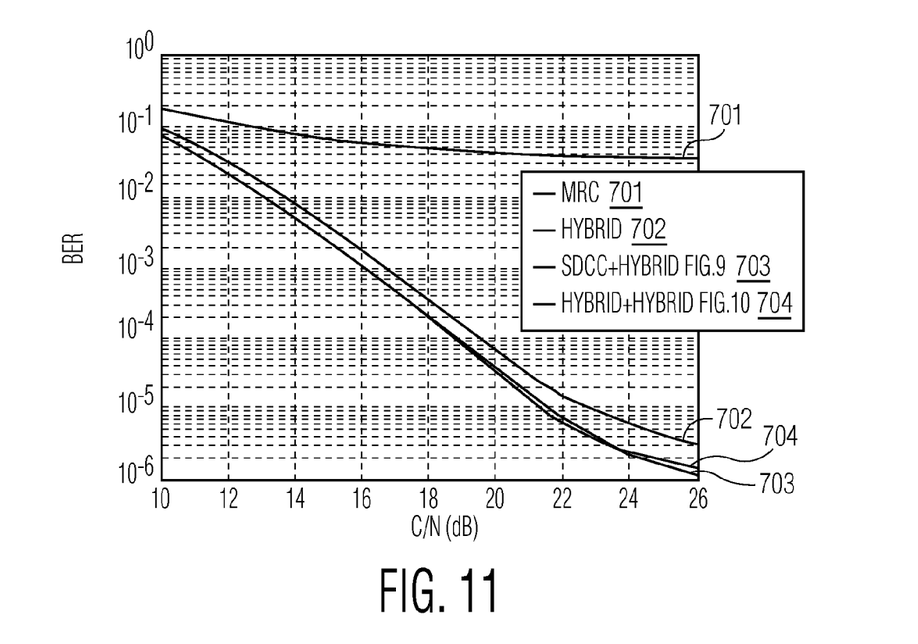
FIG. 11 illustrates a diagram of a performance comparison of different types of receivers with a Doppler frequency of 250 Hz in a rich scattering environment.
Figure 12:
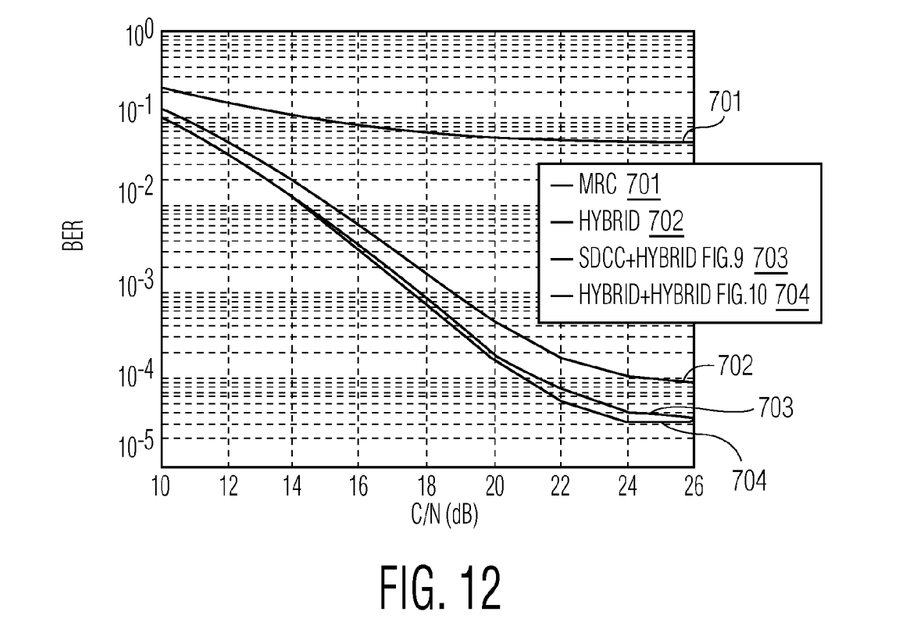
FIG. 12 illustrates a diagram of a performance comparison of different types of receivers with a Doppler frequency of 250 Hz in a poor scattering environment.

FIGS. 11 and 12 show the benefits of the new approaches of combining decision directed channel estimation with ICI subtraction and LLR trick methods by a simulation of the BER performance of a mobile OFDM system at different Doppler frequencies and channel models. A 16-QAM modulated DVB-T signal in 8K OFDM mode with a guard interval of ¼, 1116 Hz of subcarrier spacing and a convolutional coding rate R=⅔ as specified in DVB-T standard is considered. It is assumed that the initial channel estimation is simply done by interpolating the channel estimates of the scattered pilots in frequency domain only for each OFDM symbol. FIGS. 11 and 12 show the BER performance comparison of a fixed receiver ignoring the mobility effects, i.e., Maximum-ratio-combining based detection (graph 701), a conventional mobile receiver with Hybrid Doppler Compensation method comprising SDCC, 3-tap ICI subtraction and LLR trick (graph 702), the receiver of FIG. 9 (graph 703) and the receiver of FIG. 10 (graph 704).

In FIG. 11, comparison is made for a rich scattering environment with a Doppler frequency of 250 Hz. It may be observed that proposed approach of combining decision directed channel estimation with Hybrid Doppler compensation solution (graphs 703 and 704) provide a significant improvement on BER performance. The receiver of FIGS. 9 and 10 perform quite similarly both providing similar accuracy to be used in Doppler compensation methods.

In FIG. 12, BER performance comparison is made for a poor scattering environment with a Doppler frequency of 250 Hz. A similar performance enhancement with the proposed approaches may be observed in this case as well.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:

1. A mobile Orthogonal Frequency Division Multiplex (OFDM) receiver, comprising
a receiving unit for receiving a multicarrier signal via a transmitting channel,
a channel estimation unit for estimating a channel estimation signal indicative of properties of the transmitting channel based on the multicarrier signal and a feedback provided at a position of a signal processing path of the receiver downstream of the channel estimation unit, and
a compensation unit adapted for at least partially compensating signal distortions within the transmitting channel based on the multicarrier signal received by the receiving unit and the channel estimation signal estimated by the channel estimation unit, and for outputting the received multicarrier signal with at least partially compensated signal distortions, the compensation unit comprising an intercarrier interference subtraction unit for subtracting intercarrier interferences from the received multicarrier signal and a further unit for computing a reliability of the multicarrier signal using a log-likelihood ratio scheme, wherein the further unit is configured to compute a log-likelihood ratio of the multicarrier signal using remaining intercarrier interferences and noise power.

2. The receiver according to claim 1, wherein the compensation unit is a Doppler compensation unit adapted for at least partially compensating signal distortions due to mobility of the receiver.

3. The receiver according to claim 1, wherein the multicarrier signal is an Orthogonal Frequency Division Multiplex signal.

4. The receiver according to claim 1, wherein the feedback signal includes information as a basis for deciding on pilot symbols within the multicarrier signal.

5. The receiver according to claim 1, wherein the receiver comprises a demodulation unit adapted for demodulating an output signal of the channel estimation unit and the OFDM signal and for generating and sending the feedback signal to the channel estimation unit.

6. The receiver according to claim 1, wherein the receiver further comprising a demodulation unit adapted for demodulating an output signal of the intercarrier interference subtraction unit and an output signal of the channel estimation unit and for generating and sending the feedback signal to the channel estimation unit.

7. The receiver according to claim 1, further comprising a forward error correction unit adapted for receiving an output signal of the compensation unit and adapted for correcting the output signal based on an error correction code.

8. The receiver according to claim 7, further comprising a feedback unit adapted for receiving an output of the forward error correction unit, for generating the feedback signal based on the output of the forward error correction unit and for sending the feedback signal to the channel estimation unit.

9. The receiver according to claim 1, further comprising at least one of a further receiving unit and a further channel estimation unit for receiving a multicarrier signal via multiple antennas.

10. The receiver according to claim 9, wherein the compensation unit comprises further a Doppler compensation combining unit for receiving an output signal of the channel estimation unit.

11. The receiver according to claim 10, further comprising a demodulation unit adapted for demodulating an output signal of the channel estimation unit and an output signal of the Doppler compensation combining unit, and for generating and sending the feedback signal to the channel estimation unit.

12. A method of at least partially compensating signal distortions within a multicarrier signal, the method comprising receiving the multicarrier signal via a transmitting channel, estimating a channel estimation signal indicative of properties of the transmitting channel based on the multicarrier signal and a feedback signal, at least partially compensating signal distortions within the transmitting channel based on the multicarrier signal and the channel estimation signal, and outputting the received multicarrier signal with compensated signal distortions wherein at least partially compensating signal distortions comprises subtracting intercarrier interferences from the received multicarrier signal and computing a reliability of the multicarrier signal using a log-likelihood ratio scheme, wherein computing the reliability of the multicarrier signal comprises computing a log-likelihood ratio of the multicarrier signal using remaining intercarrier interferences and noise power.

13. A non-transitory computer-readable medium, in which a computer program of at least partially compensating signal distortions within a multicarrier signal is stored, which computer program, when being executed by a processor, effects a method according to claim 12.

* * * * *